United States Patent
Zhang et al.

(10) Patent No.: US 8,401,594 B2
(45) Date of Patent: *Mar. 19, 2013

(54) REDUCING POWER CONSUMPTION OF WI-FI ENABLED MOBILE DEVICES

(75) Inventors: Tao Zhang, Fort Lee, NJ (US); Sunil Madhani, Austin, TX (US); Provin Gurung, Highland Park, NJ (US); Eric Van Den Berg, Hoboken, NJ (US)

(73) Assignees: Toshiba America Research, Inc., Piscataway, NJ (US); Telcordia Technologies, Inc., Piscataway, NJ (US)

(*) Notice: Subject to any disclaimer, the term of this patent is extended or adjusted under 35 U.S.C. 154(b) by 936 days.

This patent is subject to a terminal disclaimer.

(21) Appl. No.: 12/434,982

(22) Filed: May 4, 2009

(65) Prior Publication Data

US 2009/0285142 A1  Nov. 19, 2009

Related U.S. Application Data

(62) Division of application No. 11/161,668, filed on Aug. 11, 2005, now Pat. No. 7,606,602.

(51) Int. Cl.
*H04M 1/00* (2006.01)
*H04B 1/38* (2006.01)

(52) U.S. Cl. .......... 455/574; 455/127.5; 455/556.2

(58) Field of Classification Search .......... 455/127.1, 455/127.5, 550.1, 555, 556.1, 556.2, 572, 455/574

See application file for complete search history.

(56) References Cited

U.S. PATENT DOCUMENTS

| | | | |
|---|---|---|---|
| 5,794,137 A * | 8/1998 | Harte | 455/343.4 |
| 6,807,159 B1 | 10/2004 | Shorey et al. | |
| 6,934,870 B1 | 8/2005 | Amos | |
| 7,190,980 B2 * | 3/2007 | Deolalikar et al. | 455/574 |
| 7,606,602 B2 * | 10/2009 | Zhang et al. | 455/574 |
| 2001/0016918 A1 | 8/2001 | Alexander et al. | |
| 2002/0132603 A1 | 9/2002 | Lindskog et al. | |
| 2004/0043797 A1 | 3/2004 | Shostak | |
| 2004/0076177 A1 | 4/2004 | Koch et al. | |
| 2004/0214616 A1 | 10/2004 | Malcolm | |
| 2004/0260348 A1 | 12/2004 | Bakken et al. | |
| 2005/0170801 A1 | 8/2005 | Deolalikar et al. | |
| 2005/0170868 A1 | 8/2005 | Fischer | |
| 2005/0181840 A1 | 8/2005 | Banginwar et al. | |
| 2005/0261037 A1 | 11/2005 | Raghunath et al. | |

OTHER PUBLICATIONS

M. Gerharz, "Link Stability in Mobile Wireless Ad Hoc Networks," Proceedings of the 27th Annual IEEE, Conference on Local Computer Networks (LCN '02) Nov. 2002, USA.

* cited by examiner

*Primary Examiner* — Nhan Le
(74) *Attorney, Agent, or Firm* — Westerman, Hattori, Daniels & Adrian, LLP

(57) ABSTRACT

A system and method for maximizing the standby time of mobile communication devices that have WiFi or other high energy-consuming network interfaces, by predicting in real time actionable silent periods (ASPs) of the interface and shutting the interface down during these ASPs. Standby times are significantly increased, resulting in longer periods of operation before battery charging is required, while keeping minimal the probabilities of missing incoming data packets when the interface is turned off.

17 Claims, 2 Drawing Sheets

REDUCING POWER CONSUMPTION OF WI-FI ENABLED MOBILE DEVICES

BACKGROUND OF THE INVENTION

1. Field of the Invention

The present invention relates generally to wireless networking and more particularly to systems and methods for reducing power consumption in mobile communication devices having high power consuming network interfaces, such as WiFi (e.g., IEEE 802.11) or other heterogeneous radio technology interfaces.

2. General Background Discussion

Wireless Networks

Wireless networks can incorporate a variety of types of mobile devices, such as cellular and wireless telephones, laptop computers, wearable computers, cordless phones, pagers, headsets, and PDAs (Personal Digital Assistants). Such mobile devices may include network interfaces to enable fast wireless transmission and reception of voice and/or data over the wireless network. Typical mobile devices include some or all of the following components: a transceiver (i.e., a transmitter and a receiver, including single chip transceivers having integrated transmitters and receivers); an antenna; a processor; one or more audio transducers (for example, a speaker or a microphone); a data storage medium (such as ROM, RAM, EPROM, hard disk, etc); operational memory; a full chip set or integrated circuit; and interfaces (such as USB, CODEC, UART, PCM, etc.).

Wireless LANs (WLANs) may be employed for wireless communications wherein a user can connect to a local area network (LAN) through a wireless (e.g. radio frequency) connection. Wireless communications also can include signal propagation via light, infrared, and microwave transmission. There are a variety of WLAN standards that currently exist, such as, e.g., Bluetooth, IEEE 802.11, and HomeRF.

The IEEE standard known as 802.11 specifies technologies for wireless LANs and devices. Using 802.11, wireless networking may be accomplished with each single base station supporting several devices. Mobile devices may be pre-equipped with wireless hardware or a user may install a separate piece of hardware, such as a card, that may include an antenna. In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with dedicated Bluetooth devices. The MID may have an IP address and a common IP (network) name associated with the IP address.

Wireless network devices may include Bluetooth devices, Multiple Interface Devices (MIDs), 802.11x devices (i.e., IEEE 802.11 devices including 802.11a, 802.11b and 802.11 g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for CSM Evolution) devices, TDMA type (Time Division Multiple Access) devices, or CDMA type (Code Division Multiple Access) devices, including CDMA2000. Each network device may contain addresses of varying types including an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Mobile Devices and Energy Consumption

Recently, mobile handheld devices with WiFi (IEEE 802.11) network interfaces have started to become popular. These devices include, for example, WiFi phones (also known as Voice over IP or VoIP), WiFi-cellular dual-mode phones and Personal Digital Assistants (PDAs). They allow users to take full advantage of heterogeneous radio technologies. WiFi, however, was not originally designed for energy-constrained (i.e., battery operated) handheld devices. As a result, the standby time of a handheld device with a WiFi interface is sharply lower than what is typically experienced with contemporary cellular mobile telephones. For example, a current typical WiFi phone may have a standby time of approximately 24 hours with 4 hours of talk time. On the other hand, a typical cellular telephone can have standby times up to 12 days with comparable talk times.

There are two basic categories of existing methods to make mobile devices with WiFi or other high energy-consuming network interfaces more energy-conservative. The first category modifies the WiFi and/or upper-layer protocols to make the protocols themselves more energy-conservative. These methods, however, require changes to widely accepted protocols and deployed products built to use such accepted protocols.

The second category does not change the networking protocols, but instead seeks to minimize the unnecessary consumption of energy by the high energy-consuming network interfaces. This category includes methods such as turning off power to the interfaces, or placing the interface in a low energy-consuming standby or "sleep" mode if possible, during time periods that the interface is not carrying user traffic. This can significantly reduce power consumption and hence increase the length of the mobile device's total standby time. The trade-off to such operation, however, is that during the time periods the interface is shut off, incoming user packets or voice call requests may arrive, and these packets will be lost.

To solve this problem, it has been proposed to implement a separate low-energy consuming receiver on the mobile device, in addition to other radio interfaces that already exist on the mobile device for supporting user applications, and to use it as an always-on signaling channel. When the mobile device is not actively in use, both the device and its high energy-consuming wireless network interface card are shut off. The low-energy consuming receiver will remain on to receive incoming communication signals and send "wake-up" messages to the mobile device upon receiving such incoming signals. Once awake, the mobile device uses its primary, higher power and higher rate channel to transport user traffic. This approach requires special hardware to implement the low energy-consuming signaling channel, which increases the complexity and cost of the mobile devices and also makes it difficult for widespread adoption because the necessary additional hardware cannot be easily implemented on existing mobile devices. It also has been proposed to turn off a network interface card after the interface remains idle for a certain predefined threshold. This method, however, fails to address the issue that incoming user packets and call requests may arrive during this time and become lost because the network interface is shut off.

Accordingly, there exists a need in the art for improvement in reducing energy consumption by handheld devices equipped with high energy consuming network interfaces, that increases the total standby time of such devices while minimizing the number of incoming data packets and call requests that may be lost while the network interface is turned off, and that does not require additional expensive hardware or modification of the basic network protocols themselves.

SUMMARY

The preferred embodiments of the present invention provide a new mechanism for a mobile device to dynamically shut down its high energy-consuming interface(s) in a way that overcomes the limitations of the prior approaches described above. In particular, in accordance with preferred embodiments, the present invention:

- Maximizes the total time a high energy-consuming interface can be turned off while keeping to a minimum the probability of incoming traffic arriving at the interface during the down times;
- Works for one or multiple network interfaces, or an entire mobile device;
- Allows the mobile devices themselves to perform energy management autonomously and without any assistance from the network or control by the network;
- Can be implemented completely in software on the mobile devices without requiring any extra hardware; and
- Does not rely on the availability of a separate control channel.

The preferred embodiments of the present invention can achieve significant extra energy savings beyond the energy savings obtained by existing systems and methods (such as methods that save energy by making the communication protocols more energy efficient or by optimizing the radio transmission ranges) for reducing power consumption in devices containing high energy consuming interfaces. The invention further is not limited to battery-operated devices, but is applicable to any device including a high-energy consuming component that operates in bursts, with extended periods of inactivity between the bursts.

In particular, according to some embodiments, a method is provided for reducing energy consumption of a device that operates intermittently with extended periods of inactivity between intermittent operations, including the steps of monitoring operation of the device to detect periods of inactivity, predicting the duration of a detected period of inactivity, and turning off power to the device for a period of time substantially corresponding to the predicted duration.

According to other embodiments, a mobile apparatus is provided, including a network interface, a processor, and a power supply that turns off power to the network interface in response to a signal from the processor generated in accordance with real-time monitoring by the processor of network activity through the network interface and prediction of silent period durations during which no network activity is present in the interface based on the real-time monitoring. The power supply turns off power to the network interface for a duration substantially corresponding to a predicted silent period duration. When all network interfaces on a device are shut off, the device itself can also be shut off for the duration during which all the interfaces on the device are shut off.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

For purposes of illustration and explanation, detailed embodiments of the invention will be described with respect to a mobile device with a WiFi or other high energy-consuming network interface. Throughout the remainder of the disclosure, for purposes of simplicity, the term WiFi is used to represent the high energy-consuming interface on a mobile device. The mobile device also may have additional network interfaces such as cellular network interfaces (e.g., GPRS, CDMA2000, 3GPP, 3GPP2). Examples of such mobile devices include WiFi phones and PDAs, and WiFi-cellular dual-mode phones and PDAs.

Figure 1:
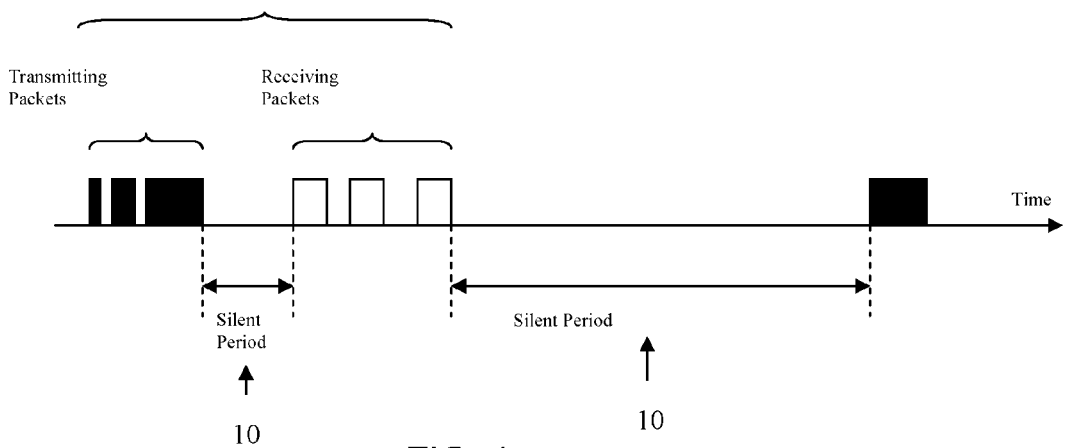
FIG. 1 is a diagram illustrating the existence of silent periods between transmission and reception of network data traffic by a mobile device of a type to which the invention is directed.

The invention is based on the observation that incoming and outgoing user traffic through a network interface will exhibit a random traffic activity pattern as exemplified in FIG. 1. (Here, user traffic is voice or data packets transported by protocols at and above the IP layer.) Typically, as shown, there will be long silent periods 10 between receiving and transmitting packets during which the mobile device does not send or receive any user traffic through the network interface. Therefore, if the mobile device can accurately predict the remaining length of a silent period, the interface may be shut down during that remaining silent time period without any negative effect, i.e., without missing or delaying any traffic that needs to come into or go out of that interface. In accordance with the invention, a real-time silence detection method is provided for determining when and for how long an interface should be turned off.

For implementation of such a silence detection method, it is desired that the total time the interface is turned off should be as long as possible to conserve energy, and that the incoming user traffic lost when the interface is turned off should be minimal. Therefore, an appropriate balance should be struck between the amount of incoming packets that are lost and the amount of energy that is conserved during operation of the mobile device. It will be noted that outgoing traffic itself can be used to trigger the mobile device to "wake" or power up the interface if it is in a "sleep" or standby mode.

According to one embodiment of the invention, the mobile device monitors the incoming and outgoing user packets through the network interface and uses the collected historical data to predict future Actionable Silent Periods (ASPs)

and shuts off its network interface during each ASP. An ASP is a time period that satisfies the following two conditions: first, it is a silent period in which there is a sufficiently high probability that no communication packets will be received or will need to be sent; second, the ASP is longer than the time it would take the mobile device to shut down the interface and to subsequently power it back up.

To be considered an ASP, the time required for the mobile device to shut down and then to turn back on an interface is subtracted from every observed silent period. Only resultant silent periods having values greater than zero are considered actual silent periods. In the rest of the disclosure, the terms silent period and ASP will be thus used interchangeably.

During an initialization period, the mobile device constructs a histogram that represents the network activities over each high energy-consuming interface (if the mobile device contains more than one network interface, which is contemplated herein, a separate histogram can be provided for each interface), by monitoring the network activities over the interface. A network activity refers to either an incoming or an outgoing user packet. The time between each network activity minus the time required for the interface to shut down and subsequently power back up is an ASP or silent period. The histogram describes the distribution of the lengths of these silent periods. For example, as shown in FIG. 1, the mobile device may detect the end of a data packet transmission, and begin to count elapsed time until the next data packet is either transmitted from the device or received by the device. When the next packet occurs, the mobile device may then subtract the shut-down and restart times from the elapsed time, and if greater than zero, increments a bin value in the histogram that corresponds to the value of the elapsed time.

Once the initial histogram is built, the mobile device starts to use the histogram to predict silent periods or ASPs. It shuts down the interface(s) during each predicted ASP. When a data packet needs to be sent from the mobile device, the interface is powered back up and the packet is then transmitted. Whenever the interface is on, the mobile device monitors network activities over the interface and uses the new observations of silent periods to update the histogram.

Prediction Model

Suppose the network activities of a given interface on a mobile device are monitored in real time. If it is detected that the interface has been silent or inactive for a minimum time period $t_0>0$ (e.g., in units of milliseconds or seconds), then a decision must be made whether to shut down the network interface, and for how long. To enable this decision to be made, the invention predicts how long the silent period is going to last beyond time $t_0$.

For purposes of explanation, it will be assumed that the lengths of silent periods are I.I.D. (Independently and Identically Distributed) random variables in the domain $[0, \infty]$. Let be a random variable representing the length of a silent period. We are interested in the following conditional probability:

$$P_{t_0}(s) = P(T_s \geq t_0 + s | T_s \geq t_0) \quad (1)$$

We denote by $p_{t_0}(s)$ the probability density function of $T_s - t_0$ given $T_s \geq t_0$. $p_{t_0}(s)$ can be calculated as $$-\frac{d}{ds} P_{t_0}(s)$$

if this derivative exists. In this case, we can use the average residual silent period given in Equation (2) below to determine the length of time the interface should be turned off:

$$E_{t_0}(T_s - t_0) \int_0^\infty s p_{t_0}(s) ds = \int_0^\infty P_{t_0}(s) ds \quad (2)$$

We can also predict the remaining silent period by determining $$q_{t_0}(\alpha) = \max\{s | P_{t_0}(s) \geq \alpha\} = s^* \quad (3)$$

which is the $\alpha^{th}$ quantile of the distribution of $T_s - t_0$ given $T_s \geq t_0$. Here, $\alpha$ is the confidence level of our predicted length $s^*$ of the remaining silent period after $t_0$ has elapsed.

The distributions mentioned above must be estimated because there does not exist any parametric family of distributions that is known to describe the length of silent periods. Such estimation can be obtained as follows. Let the histogram have N+1 bins, denoted by 0, ..., N. The granularity of the bins (i.e., the width of a bin) may correspond to the unit in which time is measured. Consequently, if a measured silent period has a length that falls in the interval [t,t+1] (i.e., the silent period is greater than t but less than t+1), its length is treated as t. The $t^{th}$ bin contains the number of silent periods with a length of t as observed by the mobile device. The number of silent periods in the $t^{th}$ bin is denoted by b[t], where t=0, ..., N. Each time the mobile device observes a silent period of length t, it increments b[t] by one.

The probability $P_{t_0}(s)$ that the residual silent period is $s^*$ given that the age of the silent period is already $t_0$ can be calculated as:

$$P_{t_0}(s) = \frac{\sum_{t=t_0+s}^{N} b[t]}{\sum_{t=t_0}^{N} b[t]} \quad (4)$$

where $t_0$ and $t_0+s$ are the same as explained above. We denote by $\alpha$ the confidence level of the predicted remaining silent period $s^*$. This prediction can be calculated as in Equation (3) by plugging in Equation (4) instead of Equation (1).

Prediction Algorithm and Implementation

Figure 2:
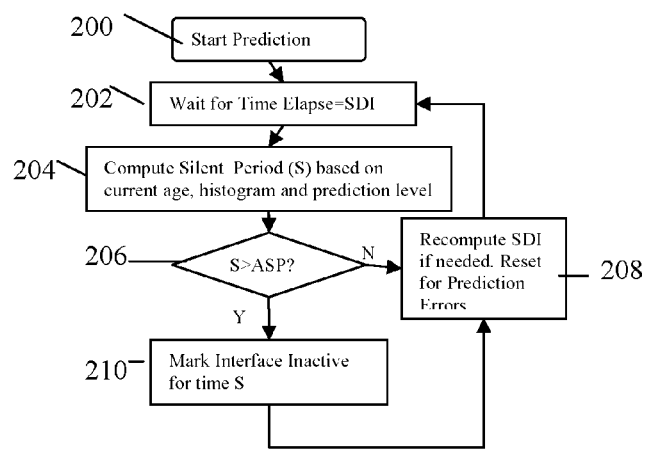
FIG. 2 is a flow diagram of a process for predicting in real time the occurrence and duration of an actionable silent period and instructing the shut-down of a network interface device for such duration in accordance with one embodiment of the invention.

FIG. 2 shows a flowchart used for the prediction according to one embodiment of the invention. The algorithm monitors the network activities at the target interface to determine the current age of a silent period. Predictions are made periodically starting at step 200. Before making the next prediction, the algorithm waits until the time period of one bin expires; otherwise it would be making the prediction for the same bin of the histogram as the prior prediction. This assumes that the histogram does not change too much during one bin period. Hence the minimum value of the Silence Detection Interval SDI 202 is set to the time period of a single bin of the histogram.

The histogram is updated by each observed new time interval between network activities. In the experiments reported here each bin in the histogram is one second wide. That is, silent periods with lifetimes in [0, 1] would fall in bin 0, silent periods with lifetimes in [1, 2] fall into bin 1, and so forth. Each network activity resets the age of the silent period to zero. At step 204, the algorithm uses Equations (3) and (4), with the age of the current silent period and the contents of the histogram to predict the residual silent period S. At step 206 the computed value S is compared with the minimum amount of elapsed time to qualify as an ASP (i.e., the value S must be greater than the time required to shut the interface and then subsequently power it back up). After the prediction, at step 208 the period SDI and the current silent age is recomputed if required such as for calibration purposes, to prevent prediction errors or recover from committed prediction errors, or if the width of the histogram's bins has been changed or modified, and the algorithm then loops back to step 202. If S is greater than this minimum time, then at step 210 the interface is turned off for a period of time equal to S, and the algorithm then loops back to steps 208 and 202.

The algorithm thus runs in an infinite loop, monitoring the current silent period age for the interface and computing the residual silent periods. The number of computations needed is independent of the number of silent periods monitored, and is linear in the histogram size N.

Performance Analysis

The method described above was run in a testbed in order to acquire a set of simulation result data. The testbed consisted of a client computer and a server computer interconnected via a local area network (LAN). The client was configured as a traffic generator. The client generated probe packets based on a Poisson distribution and sent the packets to the server. For every probe packet that the client sent to the server, it expected back a Successful or Unsuccessful response from the server. The server ran the silence detection algorithm and server software to respond to the received probe packets.

To ensure detection of the packets that arrive during the time period when the interface is shut off, the interface was not physically shut down in the experiment. Instead, the software on the server used the outcome of the silence detection algorithm to mark the state of the target interface "Active" or "Inactive". The Active and Inactive states are only software states. During the Inactive state, the server recorded the number of arriving probe packets, which would have been lost if the interface was actually shut off.

The following metrics were used to measure the performance of the algorithm in the experiments:
   Missed Probes Ratio: This is the ratio of the number of probe packets that arrive at the server while the WiFi interface is shut down to the total number of probes sent by the client to the server.
   Down Time Ratio: This is the ratio of the sum of the time that an interface is shutdown (i.e., marked "Inactive" in our experiments) to the total time that the experiment is run. If we denote by $\delta$ the down time ratio and denote by D the duration of the experiment, then $\delta*D$ represents the extra standby time the WiFi interface gains by using the proposed energy management method.

In accordance with the invention, the Down Time Ratio is maximized while keeping the Missed Probes Ratio sufficiently low. As described above, the mobile device uses an initial time period after it is first put into service as a learning period to monitor the network activities over each energy-consuming interface to construct an initial histogram before it begins to predict silent periods.

The mobile device constructs an initial histogram using the first B samples of silent periods. The silent periods that can be detected using a histogram of silent periods are determined by the distribution of the silent periods captured by the histogram. Therefore, B should be large enough so that the first B silent periods are sufficient to represent the probabilistic distribution of the silent periods.

In the experiments, the value of B was set to be 100. The histogram was constructed at a confidence level of x % where x is varied from 99 to 95. In other words, the histogram should capture x % of the silent periods. Therefore, the Missed Probes Ratio should converge to (1−x) %.

The bin size used in the histogram determines the shortest detectable silence period. In the experiments the bin size was set to 1 second. Consequently, the minimum detectable ASP in the experiments was 1 second. Using smaller bin sizes should lead to a higher Down Time Ratio than reported here.

TABLE 1

Results for 99% Confidence Level

| Mean (in seconds) | Missed Probe Ratio | Down Time Ratio |
| --- | --- | --- |
| 30 | 1% | 40% |
| 60 | 1% | 55% |
| 150 | 2.1% | 60% |

Table 1 shows the Missed Probe Ratios and the Down Time Ratios for a confidence level of 99%. It is observed from the results that the Down Time Ratio can reach as high as 50% even when the probe arrival rates are high, i.e., up to one per minute on average. As the average inter-probe arrival time increases, the Down Time Ratio further improves while the Missed Probe Ratio remains relatively low. From a different perspective, lower Missed Probe Ratios can be achieved with only slight reductions in Down Time Ratio.

Table 2 shows the same results for a confidence level of 95%. It is observed that the Down Time Ratio improved only moderately. This suggests that lowering the confidence level does not seem to help significantly increase the Down Time Ratio.

TABLE 2

Results for 95% Confidence Level

| Mean (in seconds) | Missed Probe Ratio | Down Time Ratio |
| --- | --- | --- |
| 30 | 6% | 44% |
| 60 | 5% | 58% |
| 150 | 6.5% | 63% |

Experiments also were run for prediction with no histogram, although even in this case the algorithm did spend some time learning for some statistical significance. This tiny sample space however is assumed not to represent the complete distribution. In the experiments the server waited for twenty-five probes. The factors that influenced the metrics are the same that were discussed above; however lack of data causes additional problems in prediction. The following table shows the results for various mean values with a confidence level of 95%.

TABLE 3

Results Obtained Without Initial Learning Period for Confidence Level 95%

| Mean (in Seconds) | Missed Probe Ratio | Down Time Ratio |
| --- | --- | --- |
| 30 | 9% | 40% |
| 60 | 13% | 54% |
| 150 | 35% | 76% |

It is observed from Table 3 that the values of Missed Probe Ratios are significantly higher than the results obtained in the previous section. The reasons for this are two-fold. First, when the algorithm started prediction, it did not have sufficient data in its histogram to make accurate predictions, hence resulting in excessively long predicted silent periods which led to high missed probe ratios. Second, the effect of missed probes is that since they cannot be captured by the mobile device, they cannot be used to update the histogram. This means that the more missed probes, the less accurately the histogram may represent the network activities. Missed probes do not have as much impact on performance of the prediction when a good initial histogram is built first, but as shown in Table 3, they do have a more significant impact when no initial histogram is available. As a result, it is fair to draw a conclusion that obtaining a sufficient initial histogram is important to achieving good residual silent period prediction results.

Recovery From Prediction Errors

When a mobile device misses probe packets during the time it is shut down, the histogram may not continue to accurately represent the distribution of the silent periods, which can lead to errors in future residual silent period predictions. This problem can become more serious when the initial histogram is sparse, representing very long silent periods.

Figure 3:
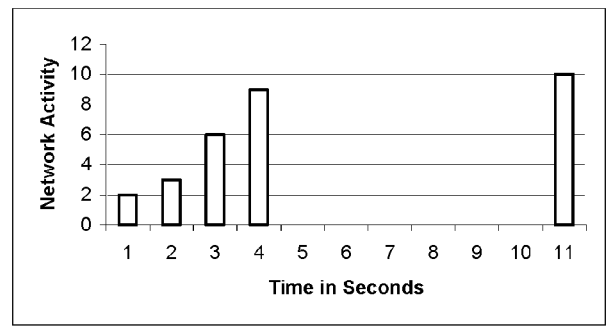
FIG. 3 is a chart illustrating an example histogram of a silent period distribution as monitored by a mobile device according to the present invention.

For example, the histogram shown in FIG. 3 shows a long null period after t=4 seconds. That is, the histogram shows no detected silent periods between t=5 seconds and t=10 seconds, while there were detected nine silent periods of t=4 seconds and ten silent periods of t=11 seconds. If a probe is missed at time t=4 seconds because the interface is turned off, then during the next silence detection period (assume it occurs at t=5), the algorithm will record the silence age as 5 seconds, when in fact it is only 1 second. Then, using 5 seconds as the age of the current silent period, the algorithm will incorrectly predict a residual silent period for the next 5 seconds. This will lead the node to miss the probe packets that might be arriving in that next 5 second time period. After the elapse of that additional 5 seconds, the silent period age used by the algorithm will be 10 seconds, leading to a further erroneous prediction until a probe is finally received. If the probes are sparse then there is a very low probability for the interface to receive future probes after occurrence of error, making the recovery of the algorithm from a prediction error difficult.

One way to recover from prediction errors is to restrict an interface from "sleeping" too long so that long sleep times caused by incorrect predictions will not likely occur. However, a disadvantage of this approach is that when the algorithm is actually predicting correctly, it will continuously underestimate the residual silent periods, hence sacrificing the energy saving efficiency of the algorithm.

Another approach is to increase the silence detection interval (SDI) as mentioned above in conjunction with FIG. 2. If the SDI is increased, the interfaces will wait longer for incoming probe packets, and hence the chances of recovering from errors are increased. However, using a large fixed value of SDI can reduce the Down Time Ratio. Therefore, according to another aspect of the invention, the value of SDI is adjusted dynamically.

One heuristic that can be used to dynamically adjust SDI is to initialize the value of the SDI to be equal to the bin width of the histogram (e.g., 1 second in the described experiments). During the run time of the prediction algorithm, if a defined short term moving average of the samples of the silent periods moves above a defined long term moving average, then SDI will be increased by one. On the other hand, when the short term moving average drops below the long term moving average, SDI is decreased by one. Experiments using the above heuristic showed that the Down Time Ratio improved to almost twice that achieved using a fixed SDI. Although the Missed Probe Ratio was always lower by limiting predicted residual silent time, the difference was less than 2% between these two approaches.

If the SDI is set dynamically, it may be possible for SDI to increase to an excessively large value if no upper bound is set. Large SDI could reduce the Down Time Ratio. Hence, the SDI should be bounded. One way is to limit the SDI to the length of the longest silent period in the histogram. Experiments show that when the upper bound of SDI is the longest silent period, the Missed Probe Ratio improves, but the Down Time Ratio also drops somewhat. Additionally, when the upper bound of SDI is half of the longest silent period, the Missed Probe Ratio remains in the same range as when the upper bound of the SDI is the longest silent period and there is little adverse effect on the Down Time Ratio.

Another method for recovery from prediction errors is a 'reset': after the device has woken up following a predicted silence sleeping period, it waits for the first incoming (or outgoing) packet received (or sent), and returns to 200 in FIG. 2.

Figure 4:
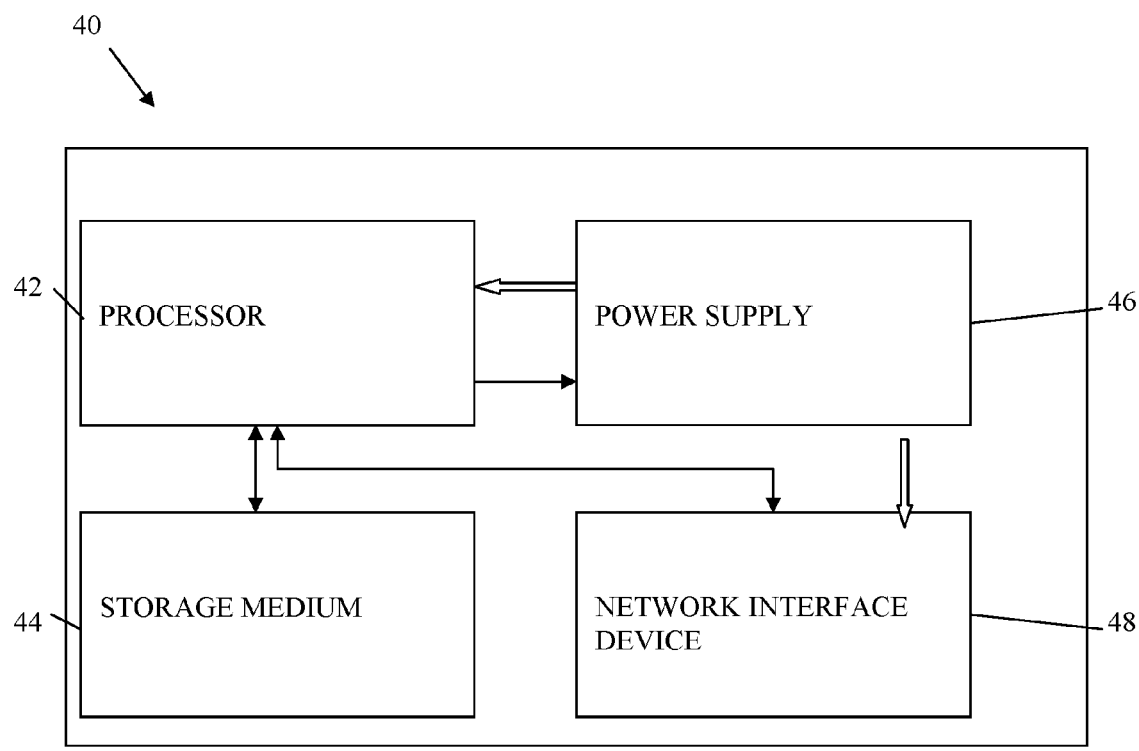
FIG. 4 is a block diagram of a network-enabled mobile communication device according to one embodiment of the present invention.

FIG. 4 is a block diagram of a generic mobile device 40 of a type that may incorporate the concepts and features of the present invention. The device 40 includes a processor 42 and storage medium 44 in the form of a disk, ROM, RAM, flash memory, etc. The storage medium may store processor-executable application instructions for performing the silent period prediction according to the invention as described above. The device 40 further includes a power supply 46 and network interface device 48, which may be an internal Network Interface Card (NIC), external network interface device or integrated network interface. Power supply 46 provides power to the processor and to the network interface device, as well as to other components of the mobile device (not shown). The processor 42 sends a command signal to the power supply 46 to shut off power to the network interface device 48 upon prediction of a residual silent period as explained above. When the residual silent period has elapsed or the processor needs to transmit a data packet over the network, the processor instructs the power supply to restore power to the network interface device if it is in a standby or sleep mode at the time that the processor needs to transmit the packet.

Conclusion

A new method and system is presented by the preferred embodiments of the present invention for maximizing the standby time of mobile devices that have WiFi or other high energy-consuming network interfaces, by predicting in real time actionable silent periods (ASPs) of the interface and shutting the interface down during these ASPs. Experimental results have shown that the preferred embodiments of the invention can significantly increase the standby times while keeping minimal the probabilities of missing incoming packets when the interface is turned off.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of reducing energy consumption of a mobile device, comprising:
    said mobile device having a network interface that operates intermittently with extended periods of application data traffic inactivity between intermittent application data traffic operations;
    said mobile device monitoring application data traffic operation of said mobile device to detect periods of application data traffic inactivity;
    said mobile device predicting the duration of a detected period of application data traffic inactivity; and
    said mobile device turning off power to said device for a period of time substantially corresponding to said predicted duration,
    wherein said network interface is coupled to a mobile communication apparatus and wherein said network interface is a WiFi interface, and
    further including the step of storing a distribution of inactivity period durations, wherein said predicting step includes the step of calculating a probability of inactivity period duration based on said stored distribution.

2. A method as set forth in claim 1, wherein said distribution is stored in a histogram.

3. A method as set forth in claim 2, further comprising the step of updating said histogram during periods that said device is active.

4. A method as set forth in claim 2, further comprising the step of setting an initial waiting period that must elapse before commencing a prediction calculation, wherein said initial waiting period corresponds to a bin resolution of bins of said histogram.

5. A method as set forth in claim 1, further comprising the step of setting an initial waiting period that must elapse before commencing a prediction calculation.

6. A method as set forth in claim 5, wherein said distribution is stored in a histogram, said method further comprising the steps of updating said histogram during periods that said device is active, and dynamically adjusting said initial waiting period in accordance with changes to said stored distribution as said histogram is updated.

7. A method as set forth in claim 6, further comprising the step of setting a predetermined maximum adjustment limit for said initial waiting period.

8. A method as set forth in claim 7, wherein said predetermined maximum adjustment limit corresponds to the longest inactivity duration stored in said histogram.

9. A method as set forth in claim 1, wherein said calculating step comprises solving the following equation:

$$P_{t_0}(s) = \frac{\sum_{t=t_0+s}^{N} b[t]}{\sum_{t=t_0}^{N} b[t]}$$

wherein $P_{t_0}(s)$ is the probability that a residual silent period of inactivity is s given that a silent period of $t_0$ has already occurred.

10. A method as set forth in claim 9, wherein the residual silent period of inactivity s is calculated according to the following equation:

$$q_{t_0}(\alpha) = \max\{s | P_{t_0}(s) \geq \alpha\} = s^*$$

which is the $\alpha^{th}$ quantile of the distribution of $T_s - t_0$ given $T_s \geq t_0$, wherein $T_s$ is a random variable representing the length of a silent period of inactivity, and s* corresponds to the predicted value of s.

11. A mobile apparatus, comprising:
    a network interface;
    a processor; and
    a power supply that turns off power to said network interface in response to a signal from said processor generated in accordance with real-time monitoring by said processor of network activity through said network interface and prediction of silent period durations during which no network activity is present in said interface based on said real-time monitoring;
    wherein said power supply turns off power to said network interface for a duration substantially corresponding to a predicted silent period duration,
    wherein said network interface is a WiFi network interface, and
    wherein said mobile device is configured to store a distribution of inactivity period durations and to predict said silent periods by calculating a probability of inactivity period duration based on said stored distribution.

12. The mobile apparatus of claim 11, further comprising a storage medium that stores a distribution of durations of said silent periods.

13. The mobile apparatus of claim 12, wherein said distribution is stored in the form of a histogram.

14. The mobile apparatus of claim 12, wherein said storage medium further stores processor-executable instructions for calculating a probability of a predicted silent period duration based on said distribution.

15. The mobile apparatus of claim 12, wherein said storage medium further stores a predetermined adjustable waiting time period that must elapse before said processor predicts a silent period duration.

16. The mobile apparatus of claim 15, further including a maximum value to which said predetermined adjustable waiting time period may be adjusted.

17. The mobile apparatus of claim 16, wherein said maximum value corresponds to the longest silent period duration in said distribution.

* * * * *